(12) United States Patent
Ladouceur et al.

(10) Patent No.: US 8,150,481 B2
(45) Date of Patent: Apr. 3, 2012

(54) SYSTEM FOR OPENING AND CLOSING A MOBILE COMMUNICATION DEVICE

(75) Inventors: Norman M. Ladouceur, Waterloo (CA); Jason T. Griffin, Waterloo (CA)

(73) Assignee: Research In Motion Limited, Waterloo (CA)

( * ) Notice: Subject to any disclaimer, the term of this patent is extended or adjusted under 35 U.S.C. 154(b) by 541 days.

(21) Appl. No.: 12/370,807

(22) Filed: Feb. 13, 2009

(65) Prior Publication Data

US 2010/0210326 A1    Aug. 19, 2010

(51) Int. Cl.
*H04M 1/00* (2006.01)
(52) U.S. Cl. ................ 455/575.3; 455/550.1; 455/575.1
(58) Field of Classification Search .... 455/575.1–575.3, 455/550.1
See application file for complete search history.

(56) References Cited

U.S. PATENT DOCUMENTS

| | | | |
|---|---|---|---|
| 6,353,733 B1 | 3/2002 | Murray et al. | |
| 2005/0236869 A1 | 10/2005 | Ka et al. | |
| 2007/0072656 A1* | 3/2007 | Lo et al. | 455/575.3 |
| 2008/0151481 A1 | 6/2008 | Misawa | |
| 2008/0232071 A1 | 9/2008 | Schechtel et al. | |
| 2009/0093283 A1* | 4/2009 | Mizuta et al. | 455/575.3 |
| 2009/0117954 A1* | 5/2009 | Lee et al. | 455/575.3 |
| 2011/0007469 A1* | 1/2011 | Kemppinen | 361/679.08 |

* cited by examiner

*Primary Examiner* — Nick Corsaro
*Assistant Examiner* — Chuong A Ngo
(74) *Attorney, Agent, or Firm* — Ridout & Maybee LLP

(57) ABSTRACT

A wireless handheld device comprises a lower casing having a bottom end and a top end and a lid having a bottom end and a top end. The top end of the lid is rotatably coupled to the top end of the lower casing with at least one hinge component such that the handheld device is rotatable from a closed position to an open position and from an open position to a closed position. The lid and the lower casing have adjacent facing surfaces when in the closed position. When the wireless handheld device is in the closed position, at least the bottom end of the lid is displaceable relative to the lower casing generally in an axial direction of the hinge component such that the facing surfaces become misaligned for easy grasping of the lower casing and the lid.

14 Claims, 12 Drawing Sheets

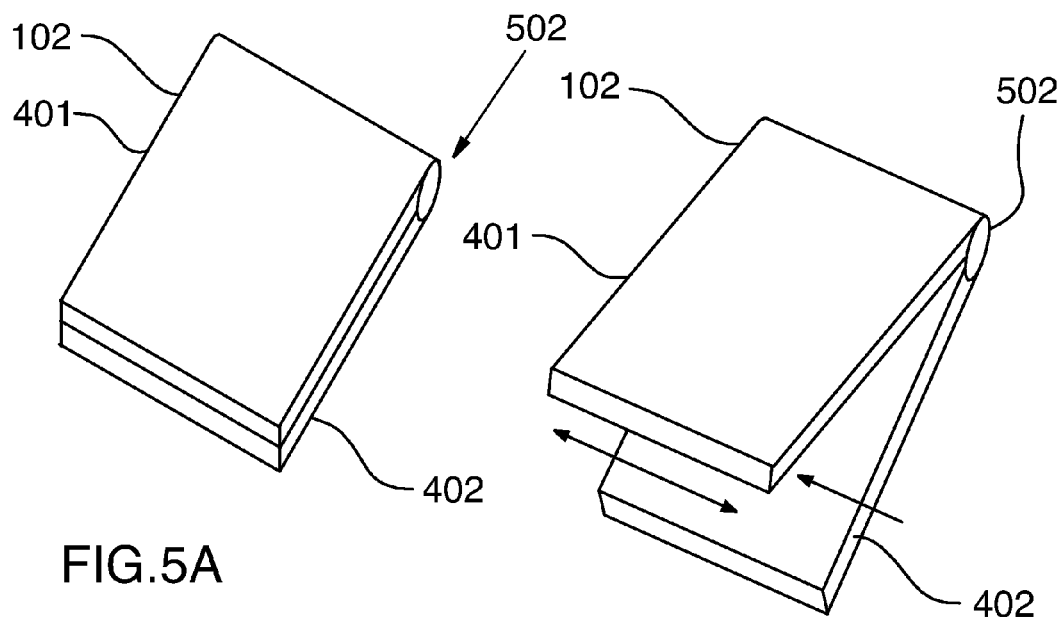
FIG.5A
FIG.5B
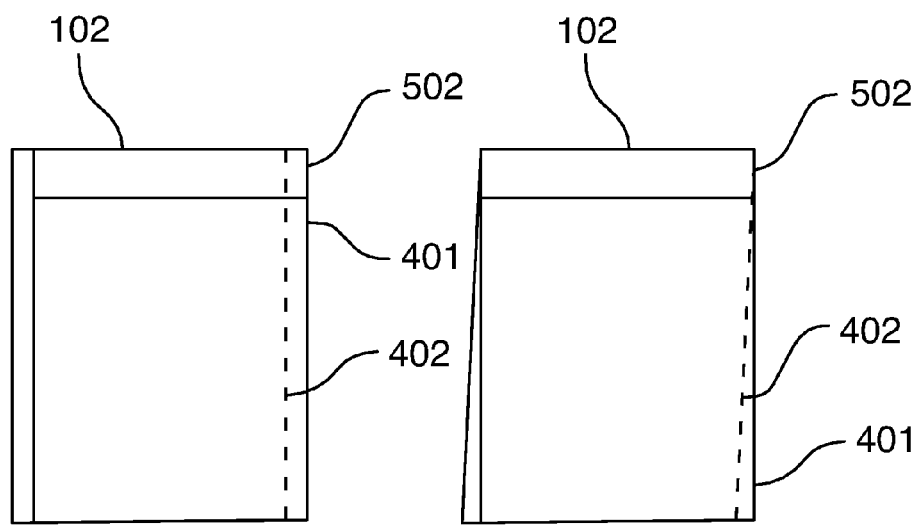
FIG.5C
FIG.5D

SYSTEM FOR OPENING AND CLOSING A MOBILE COMMUNICATION DEVICE

TECHNICAL FIELD

The present disclosure relates generally to mobile communication devices, and more particularly to a system and method for opening and closing a mobile communication device.

BACKGROUND

Clamshell or flip-style mobile communication devices generally have a base and a hinged or sliding lid that can be closed over the base. These devices can be difficult to open as the user is forced to attempt to wedge his finger or thumb nail into a gap in the housing (e.g., between the base and lid) as the user attempts to overcome the force that is holding the mobile communication device closed. This can be particularly difficult with newer, slimmer devices, as there is much less substance to the base and/or lid for users to contact with their fingers.

This can have an undesirable effect, such as inadvertent loss of information that the user did not intend when the user cannot open the device quickly enough, such as not being able to answer a telephone call before the ring ends. Further, the telephone must process the redundant data entry operation that inevitably follows the inadvertent loss of opportunity to answer a call, which needlessly uses up computing resources on the device, such as processing and battery power. It would be desirable to have a mobile communication device that is easier to open and, as a result, does not waste power and processing resources, as well as the user's time, in this way.

BRIEF DESCRIPTION OF THE DRAWINGS

Reference will now be made to the drawings, which show by way of example embodiments of the present disclosure, and in which:

FIGS. 5a and 5b are perspective views illustrating a clamshell device in accordance with one embodiment;

FIGS. 5c and 5d are front views illustrating a clamshell device in accordance with one embodiment;

It will be noted that throughout the appended drawings, like features are identified by like reference numerals.

DETAILED DESCRIPTION

In some aspects there is a wireless handheld device. The wireless handheld device comprises a lower casing and a lid. The lower casing has a bottom end and a top end. The lid has a bottom end and a top end, the top end of the lid being rotatably coupled to the top end of the lower casing with at least one hinge component such that the handheld device is rotatable from a closed position to an open position and from an open position to a closed position. The lid and the lower casing have adjacent facing surfaces when in the closed position. When the wireless handheld device is in the closed position, at least the bottom end of the lid is displaceable relative to the lower casing generally in an axial direction of the hinge component such that the facing surfaces become misaligned for easy grasping of the lower casing and the lid.

In some aspects there is provided a wireless device having a lower casing and a lid. The lower casing has a bottom end and a top end. The lid has a bottom end and a top end and two side edges extending between the top end and the bottom end with the top end of the lid being rotatably coupled to the top end of the lower casing with at least one hinge component such that the wireless handheld device is rotatable from a closed position to an open position and from an open position to a closed position. The lid and the lower casing have adjacent facing surfaces when in the closed position. The lid further has a slideable component contained near the bottom end of the lid. The slideable component is contained within the lid and protrudes from at least one of the side edges of the lid and is slideable generally in an axial direction of the hinge. The slideable component effects a physical movement to begin an opening of the wireless handheld device.

Figure 1:
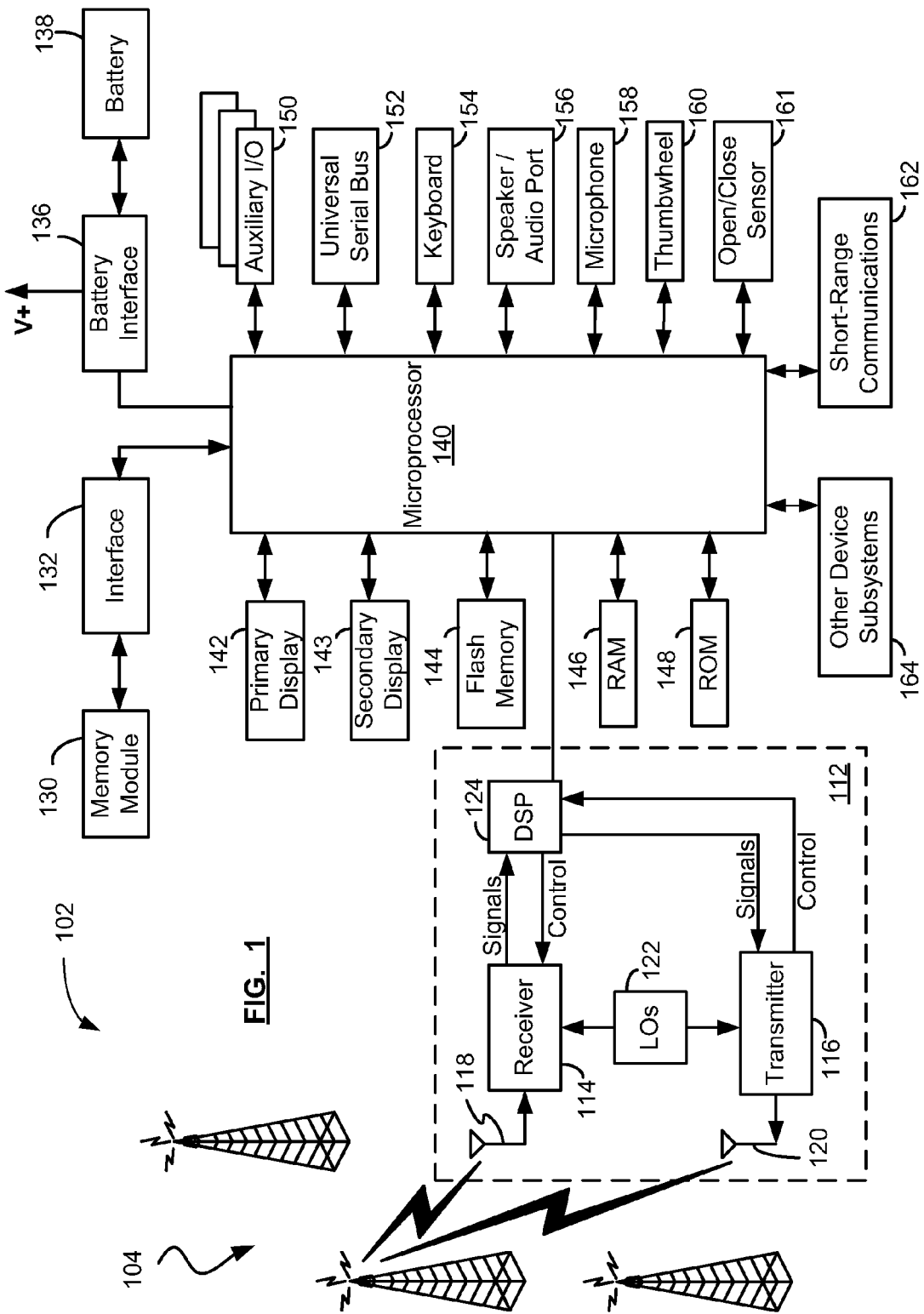
FIG. 1 shows in block diagram form a wireless device suitable for having a system in accordance with an embodiment.

Reference is first made to FIG. 1, which shows a block diagram illustrating a wireless device 102 suitable for having a system for opening and closing in accordance with one aspect of the present disclosure. It will be understood that references to a wireless device in this disclosure may also refer to a clamshell or flip-style wireless handheld device or to a clamshell or flip-style mobile communication device. The teachings of this disclosure may be applicable to any wireless device having a moveable or removable cover that covers the main display and/or keypad, and is not limited to clamshell devices. Therefore, when the present description and claims refer to a flip-style mobile communication device or clamshell wireless device, the intent is to include any mobile communication device that has a main body portion or lower casing with a moveable or removable cover portion or lid. An example of such a wireless device having a lower casing and lid is discussed below in connection with FIGS. 4A and 4B, and is shown in detail in respect of FIGS. 5-13. The wireless communication device 102 is intended to include, but not be limited to, a wireless device having a lower casing where a lid slides over the lower casing from a first position to a second position, a wireless device having a lower casing where a lid is attached to the lower casing with a hinge mechanism, a wireless device having a lower casing where a lid is rotatably connected to the lower casing, and combinations thereof. For example, some wireless devices have a lower casing with a lid, where the lid slides off of the lower casing to a raised position and the lid is then configured to rotate in this raised position.

The wireless device 102 communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway 210 and to a wide area network 228, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a mobile communication device (with or without telephony capabilities), a wireless handheld device, a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, an optional secondary display 143, a flash memory 144, a random access memory (RAM) 146, a read-only memory (ROM) 148, auxiliary input/output (I/O) subsystems 150, a data port such as Universal Serial Bus (USB) port 152, a keyboard or keypad 154, a speaker or audio port 156 for connecting to, for example a set of headphones or an earpiece, a microphone 158, a clickable thumbwheel, scroll ball, track ball, or thumbwheel 160, an open/close sensor 161, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, and the clickable thumbwheel 160, for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards, mini SD cards, micro SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation increases the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the clickable thumbwheel 160 in conjunction with the primary display 142 and possibly the auxiliary I/O device 150. The keypad 154 maybe either a complete alphanumeric keypad, a reduced keypad, or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156. Additionally, a wireless speaker/microphone device such as a Bluetooth headset may be used with the wireless device 102.

The USB port 152 is normally implemented in a personal digital assistant (PDA) type communication device for which synchronization with a user's computer is a desirable, albeit optional, component. The USB port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, and/or 802.11n.

Figure 2:
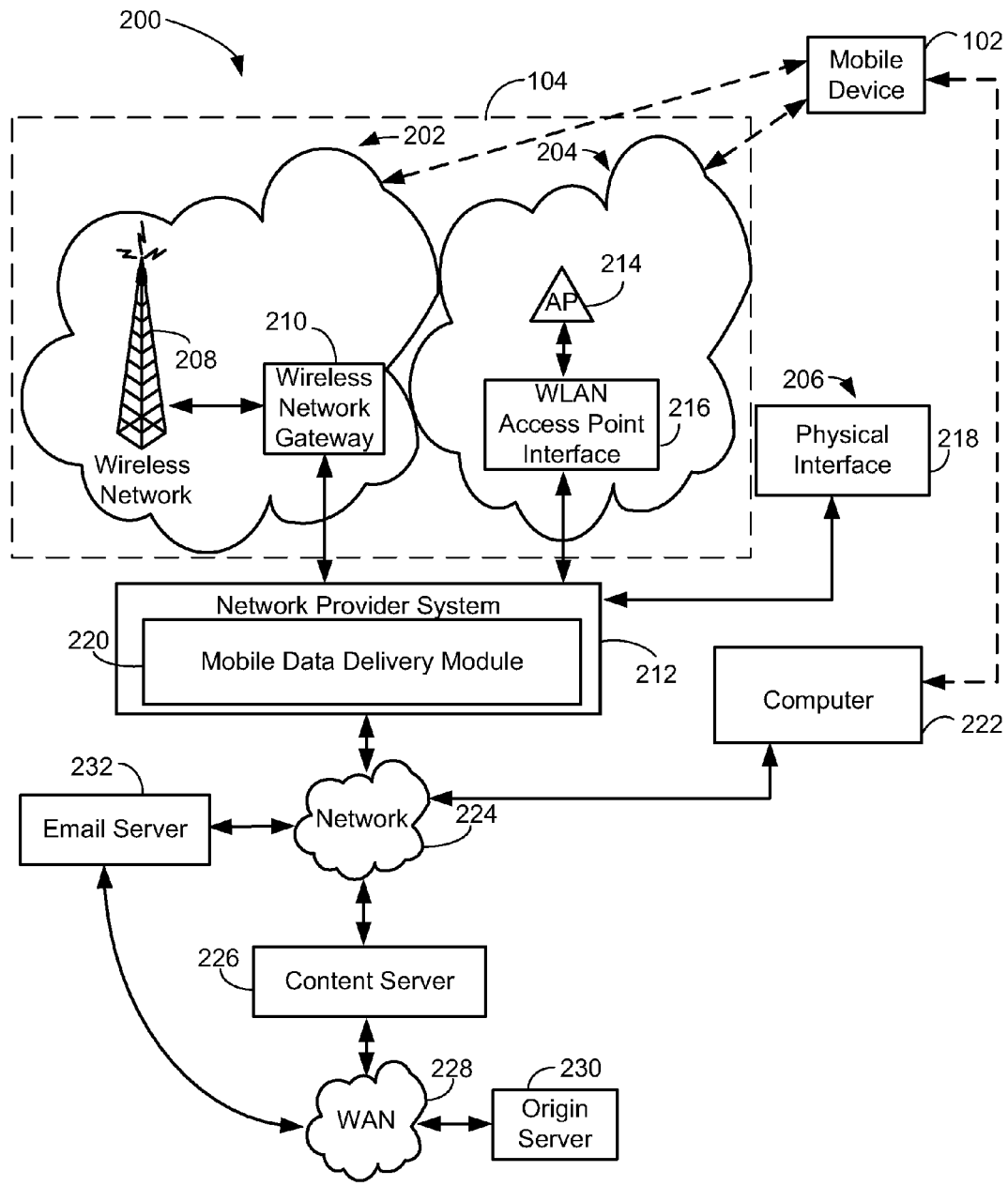
FIG. 2 shows in block diagram form a communication system suitable for providing the operating environment of the wireless device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the USB port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
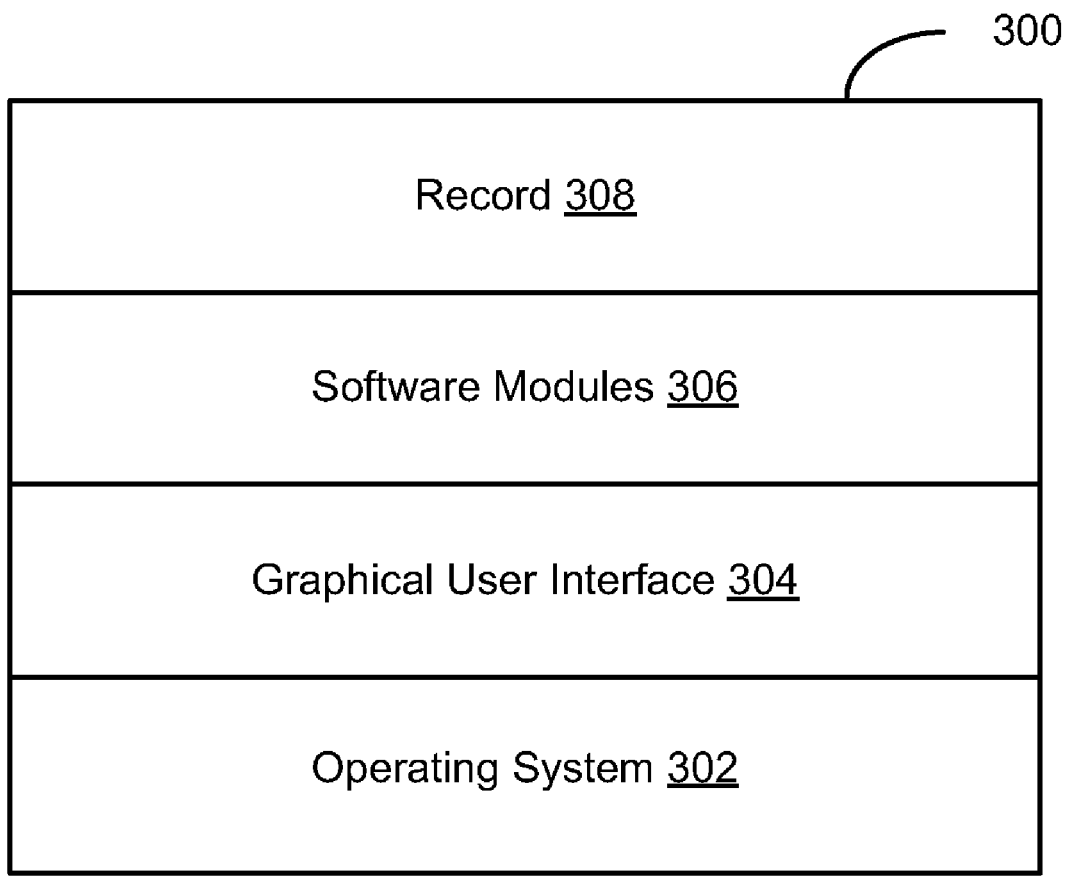
FIG. 3 shows in block diagram form the contents of a memory of the wireless device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking clamshell mobile communication device for sending and receiving data items, such as instant messages, for making and receiving voice calls, and for creating calendar events and alerts. To provide a user-friendly environment to control the operation of the wireless device 102, an operating system (OS) 302 resident on the wireless device 102 provides a basic set of operations for supporting various applications typically operable through a graphical user interface (GUI) 304, which may include a secondary GUI for display on the optional secondary display 143.

The operating system 302 provides basic input/output system features to obtain input from the auxiliary I/O 150, the keypad 154, the clickable thumbwheel 160, the open/close sensor 161, and other input devices, and to facilitate output to the user via at least one of the primary display 142 and the secondary display 143. The GUI 304 is typically a component of the operating system 302. One or more software modules 306 for managing communications or providing a personal digital assistant (PDA) or other functions may also be included. The memory 300 may include a record 308 for saving of data by any of the software modules 306.

The memory 300 also includes an email and calendar client, which may be combined in, for example, a PIM application having email-based calendaring and scheduling functions. Typically, the PIM is installed as one of the software modules 306. Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4A:
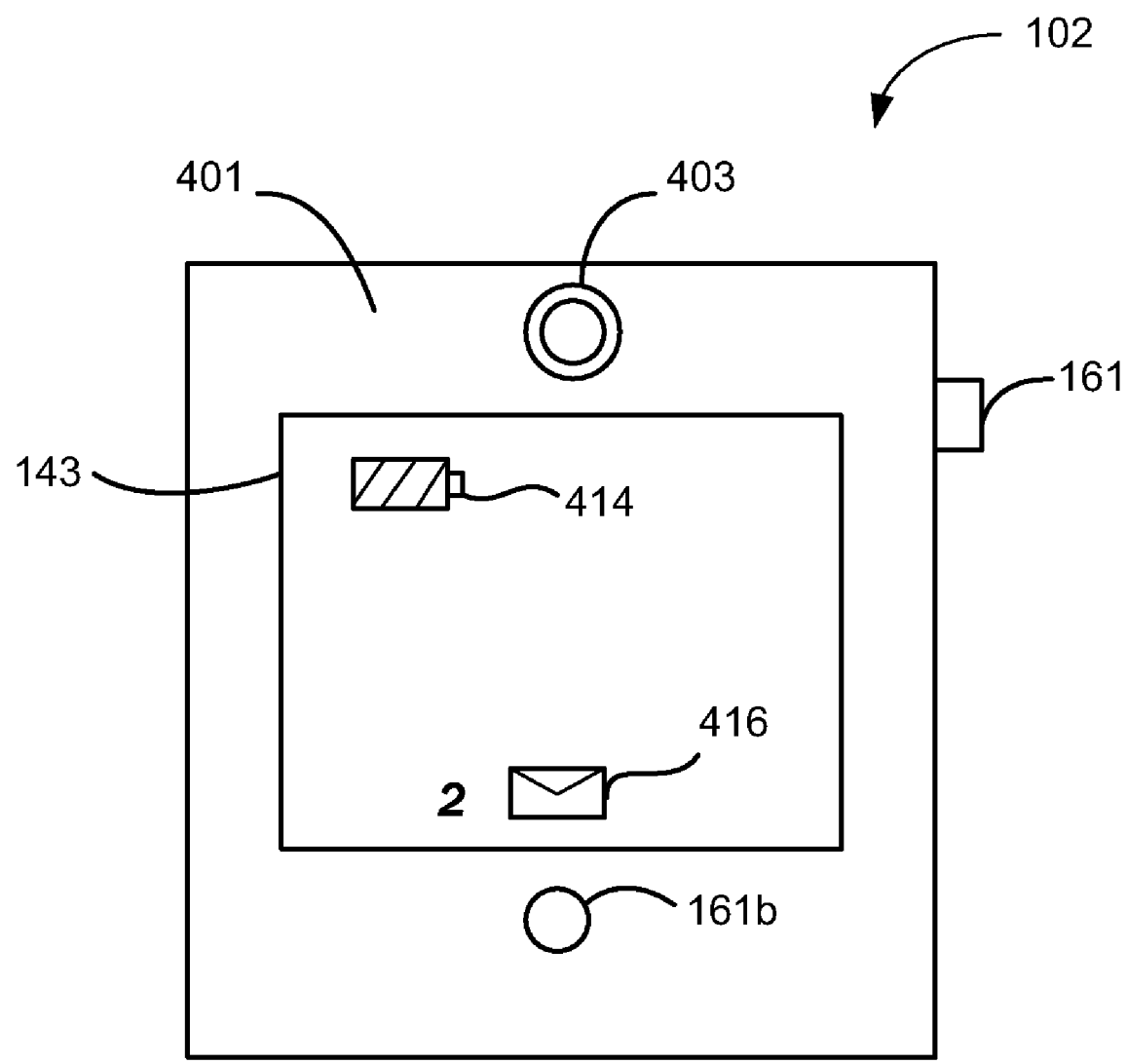
FIG. 4A is a front view illustrating an embodiment of the wireless device of FIG. 1 in a closed configuration.

Reference is next made to FIG. 4A, which shows a front view of an embodiment of a wireless device 102 in a closed configuration. In the shown embodiment, the wireless device 102 is a clamshell mobile communication device. As mentioned above, the wireless device 102 may be a data and/or voice-enabled handheld device. The wireless device 102 includes the primary display 142 that is visible when the wireless device 102 is in an opened configuration (FIG. 4B), and the optional secondary display 143 that is visible when the wireless device 102 is in a closed configuration. The term visible as used above is meant to say that the display may be viewable by the user looking at the front of the wireless device 102; however, the display may or may not be active or displaying the GUI 304 even when the display is not visible to the user. The primary display 142 may be off when the wireless device 102 is in the closed configuration in order to save battery power. Similarly, the secondary display 143 may be off when the wireless device 102 is in the opened configuration in order to save battery power, or the secondary display 143 may show a default image such as a background or a clock when the wireless device 102 is in the opened configuration. The front view of the closed wireless device 102 shows a lid 401, having the optional secondary display 143. The lid 401 may also include secondary navigation tools such as a selection button 161 or a secondary trackball 161b, and a camera lens 403. Although the selection button 161 may be used as a navigation tool for the secondary display 143 when the wireless device 102 is in the closed configuration, the selection button 161 may provide other functions, for example volume or camera control, when the wireless device 102 is in an opened configuration. These other functions for the selection button 161 may be disabled when the wireless device 102 is in the closed configuration, to prevent unintentional activity.

Figure 4B:
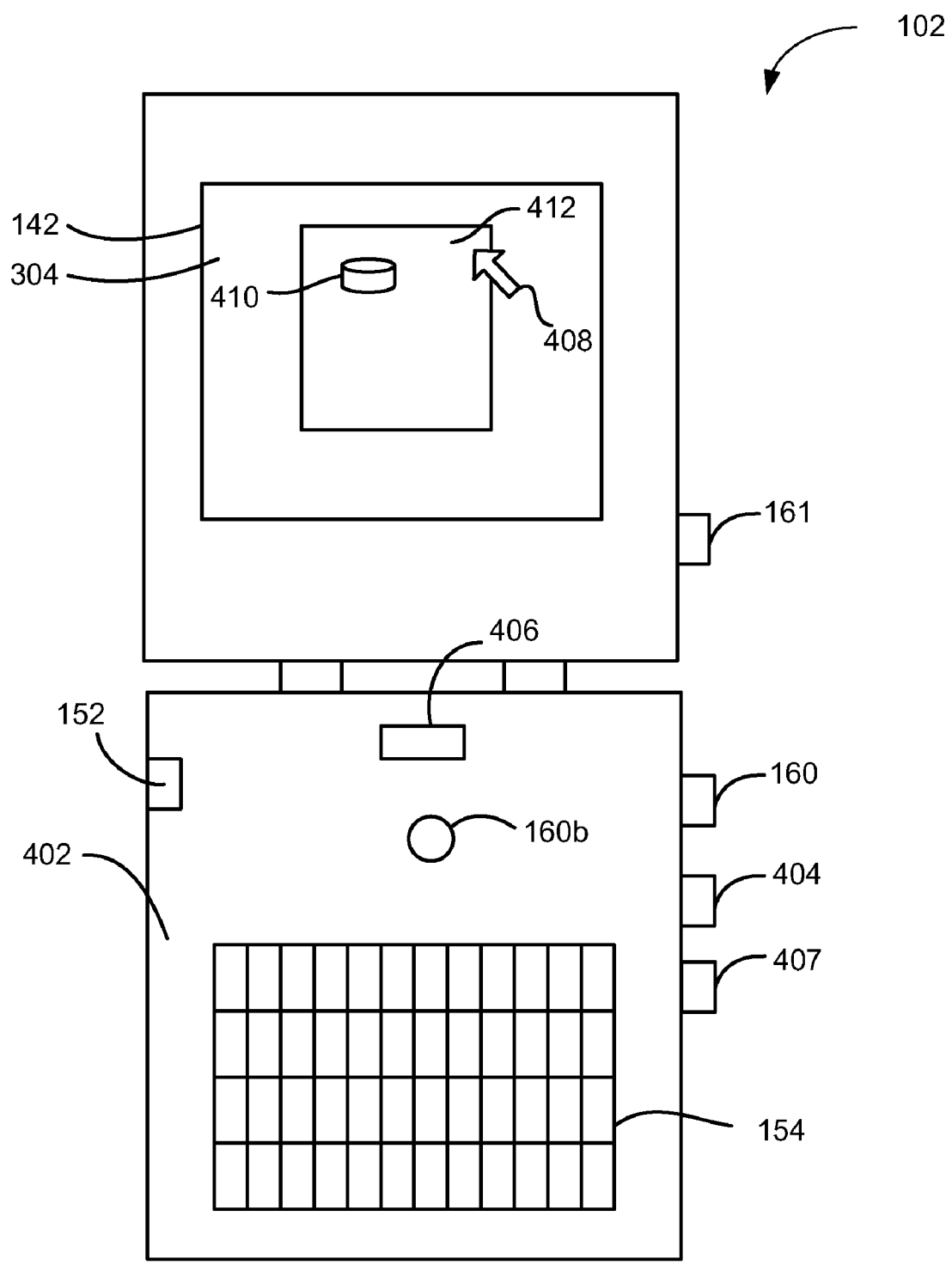
FIG. 4B is a front view illustrating the wireless device of FIG. 4A in an opened configuration.

Reference is next made to FIG. 4B, which shows a front view of the wireless device 102 of FIG. 4A in an opened configuration. The wireless device 102 includes a lower casing 402, the USB port 152, the primary display 142, which displays the GUI 304, the keypad 154, the clickable thumbwheel 160 or other device for navigation such as a trackball 160b, one or more input buttons 404 (e.g., select, cancel, talk buttons), signal inputs/outputs 406 (e.g., power connector input, microphone, speaker, data interface input, etc.), and an audio port 407. Although the wireless device 102 is shown with the primary display 142 being on the inside of the lid 401, the primary display 142 may also be on the lower casing 402 or in any other suitable location. Although the wireless device 102 is shown as having a selection button 161, the clickable thumbwheel 160 may be used instead, and the selection button 161 will be understood to apply equally to the clickable thumbwheel 160. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the primary display 142, the secondary display 143, the clickable thumbwheel 160, etc.

The microprocessor 140 is typically coupled to one or more input devices (e.g., the buttons 404, the keypad 154, the clickable thumbwheel 160, the open/close sensor 161) for receiving user commands, selections or queries, and the primary display 142 and the secondary display 143 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 142 or the secondary display 143. The microprocessor 140 is also coupled to the memory 300.

A user may interact with the wireless device 102 and its software modules 306 using the GUI 304. The GUI 304 is controlled by the operating system 302 (FIG. 3) and provides a display format providing information to the user, or enabling the user to choose commands, execute application programs, manage computer files, and perform other functions by selecting pictorial representations (i.e., icons), or selecting items from a menu through the use of an input or pointing device such as the clickable thumbwheel 160 or the keypad 154. Generally, the GUI 304 is used to convey information and receive commands from users and includes a variety of GUI objects or controls including icons, toolbars, drop-down menus, pop-up menus, text, dialog boxes, buttons, etc. A user typically interacts with the GUI 304 presented on the display 142 by using an input or pointing device to position a pointer or cursor 408 over an object 410 (i.e., "pointing" at the object) and by "clicking" on the object 410 (e.g., by depressing the thumbwheel 160 or a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable.

Typically, a GUI-based system presents application, status, and other information to the user on the primary display 142 and the secondary display 143. The GUI 304 may provide for a full user interface on the primary display 142 and may provide a condensed or simplified user interface on the secondary display 143. For example, the GUI 304 may provide a window 412, which is a display area shown within the primary display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area.

The GUI 304 may provide for simplified user interaction on the secondary display 143 when the wireless device 102 is closed. For example, the GUI 304 may provide status information, such as a battery status 414, but may not provide for full applications to be displayed. An event notification 416 may also be presented, alerting the user to a new or unacknowledged event, such as an incoming email, an incoming text message, an incoming phone call, an incoming multimedia message (MMS), an incoming instant message (IM), a voice mail notification, a task reminder, an upcoming calendar event, or an alarm event. The user may select an event notification 416 using the selection button 161. Additional information may be presented on the secondary display 143, such as the current time, or other background icons.

Figure 5E:
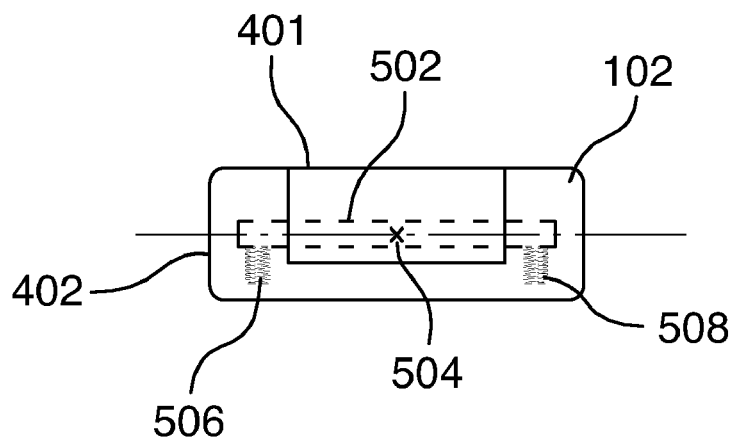
FIGS. 5e, 5f, and 5g are top views illustrating various hinge assemblies of a clamshell device in accordance with one embodiment.
Figure 5F:
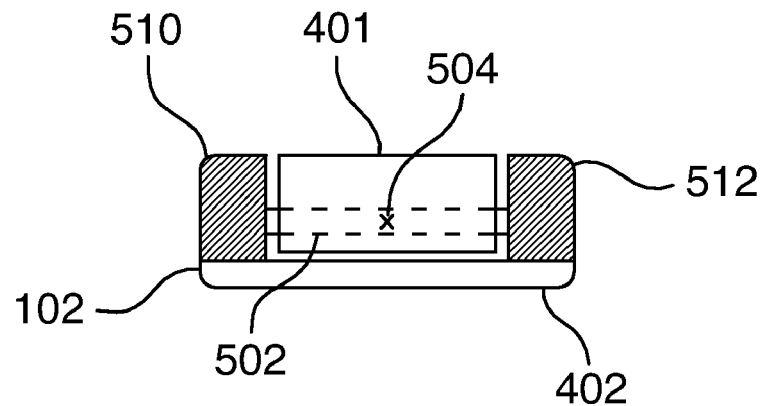
Figure 5G:
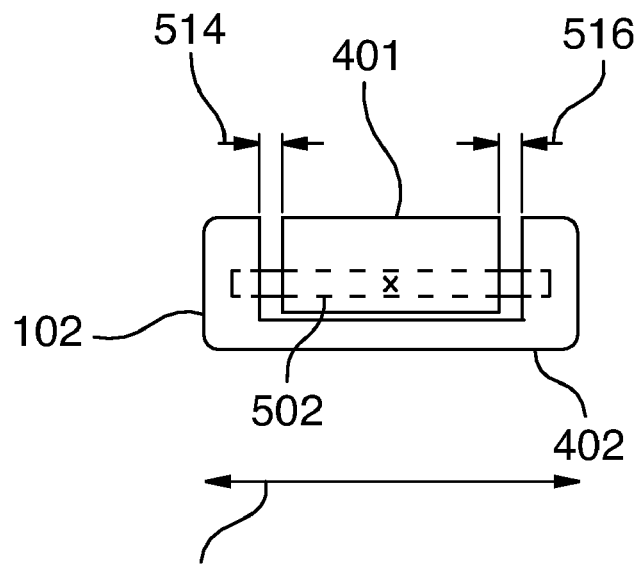

Reference is next made to FIGS. 5a, 5b, 5c, 5d, 5e, 5f, and 5g collectively referred to as FIG. 5. The wireless device 102 is henceforth referred to as the clamshell device 102, in order to reflect the content of FIGS. 5-13. FIGS. 5a and 5b show perspective views of the clamshell device 102 in accordance with one embodiment of the present disclosure. FIGS. 5c and 5d show front views of the clamshell device 102 in accordance with one embodiment of the present disclosure. FIGS. 5e, 5f, and 5g show top views of the clamshell device 102 having different hinge components in accordance with embodiments of the present disclosure. FIG. 5a shows the clamshell device 102 in a closed position, while FIG. 5b shows the clamshell device 102 in a slightly opened position. As shown in FIG. 5, the clamshell device includes the lid 401 and the lower casing 402. The lid 401 and the lower casing 402 are attached at their upper or top ends with a hinge component or pin 502, with the lid 401 rotatably coupled to the lower casing 402. The clamshell device 102 is rotatable from the closed position to the open position and back from the open position to the closed position. In the closed position, the lid 401 and lower casing 402 have adjacent facing surfaces, as shown in FIGS. 5a and 5b.

In the example where the hinge component 502 comprises only a single hinge or a pin, the hinge has a single axis. The lid 401 may be slideable or displaceable generally in the axial directions (e.g., either left or right from the front perspectives of FIGS. 5c and 5d) with respect to the lower casing 402, which may cause the facing surfaces to become misaligned (e.g., as shown in FIGS. 5c and 5d) and make it easier for a user to grasp the lid 401 and/or the lower casing 402 in order to open the clamshell device 102. In another example, the lid 401 may also be slightly rotatable with respect to the lower casing 402 about an axis normal to the axis of the pin 502. This slideable or rotatable movement may be enabled by the hinge component 502 comprising any of a spring hinge section, flexible material, or moving hinge pin, which are described below in connection with FIGS. 5e, 5f, and 5g. FIG. 5c shows the situation where the lower casing 402 is slideable in the axial direction of the pin 502 relative to the lid 401 and FIG. 5d shows the situation where the lower casing 402 is rotatable about an axis normal to the hinge pin 502 relative to the lid 401, so that the lid 401 twists relative to the lower casing 402.

FIG. 5e shows the clamshell device having a spring hinge component 502 including one or more springs. In the example shown in FIG. 5e, two springs 506 and 508 are shown to spring load the placement of the hinge 502, which allows for some rotation generally about a point X, indicated by reference 504. FIG. 5f shows the hinge component 502 connecting to flexible material, indicated by hashed sections 510 and 512, on the lower casing 402. Again, the flexible material 510 and 512 allows for some rotation generally about the point X, indicated by reference 504. FIG. 5g shows the clamshell device having gaps, indicated by references 514 and 516, about the hinge component 502 and in between the lower casing 402 and the lid 401. The gaps 514 and 516 allow the lid 401 to slid axially in the direction of the arrow, indicated by reference 518. The embodiments shown in FIGS. 5e, 5f, and 5g are intended to be exemplary only, and the present application is intended to embrace any suitable hinge assembly that provides for the lid 401 to be slideable or rotatable about the lower casing 402 for misaligning the lid 401 and the lower casing 402, as described herein.

The configuration described in connection with FIG. 5 is intended to make it easier for a user to open the clamshell device 102. For example, typical clamshell devices are difficult to open because an initial force is needed to initially separate the lid from the lower casing, after which the device becomes easier to flip open once this motion has been started. This initial force is typically related to the force holding the clamshell device shut (e.g., caused by a spring or magnet). This initial force is initially difficult to exert on typical clamshell devices because the lid and lower casing are usually thin and nearly perfectly aligned with respect to each other, which makes it difficult to grasp both opposing parts (i.e., the lid and lower casing) in order to exert the opening force and open the typical clamshell device.

The configuration described in connection with FIG. 5 provides the user with alternative approaches to opening the clamshell device 102. In one example, the clamshell device 102 may be opened by a user who initially exerts a force in one axial direction on one portion of the clamshell device 102 (e.g., the lid 401) and exerts a force in the opposite axial direction on the other portion of the clamshell device 102 (e.g., the lower casing 402). In one example, the opposing forces exerted on the lid 401 and the lower casing 402 result in the lid 401 sliding slightly in the axial direction in relation to the lower casing 402, which means that the lid 401 and the lower casing 402 are no longer in perfect alignment and protrude at the sides relative to one another (shown in FIG. 5c). In another example, the opposing forces exerted on the lid 401 and the lower casing 402 result in the lid 401 rotating slightly about an axis normal to the axis of the pin 502 in relation to the lower casing 402, which means that the lid 401 and the lower casing 402 are no longer in perfect alignment and protrude at the sides relative to one another near the open or lower end of the clamshell device 102 (shown in FIG. 5d). This allows the user to easily grasp the lid 401 and the lower casing 402 and open the clamshell device 102. The movements described above may be generally referred to as a twisting motion applied to the clamshell device 102, which is used to disengage or overcome the force holding the device 102 closed in order to start the opening of the device 102. The twisting motion may be applied either to the left or the right (e.g., the lid 401 relative to the lower casing 402). This alternative approach to opening a clamshell device 102, in contrast to conventional devices, may be advantageous to users with conditions such as arthritis or palsy.

Figure 6A:
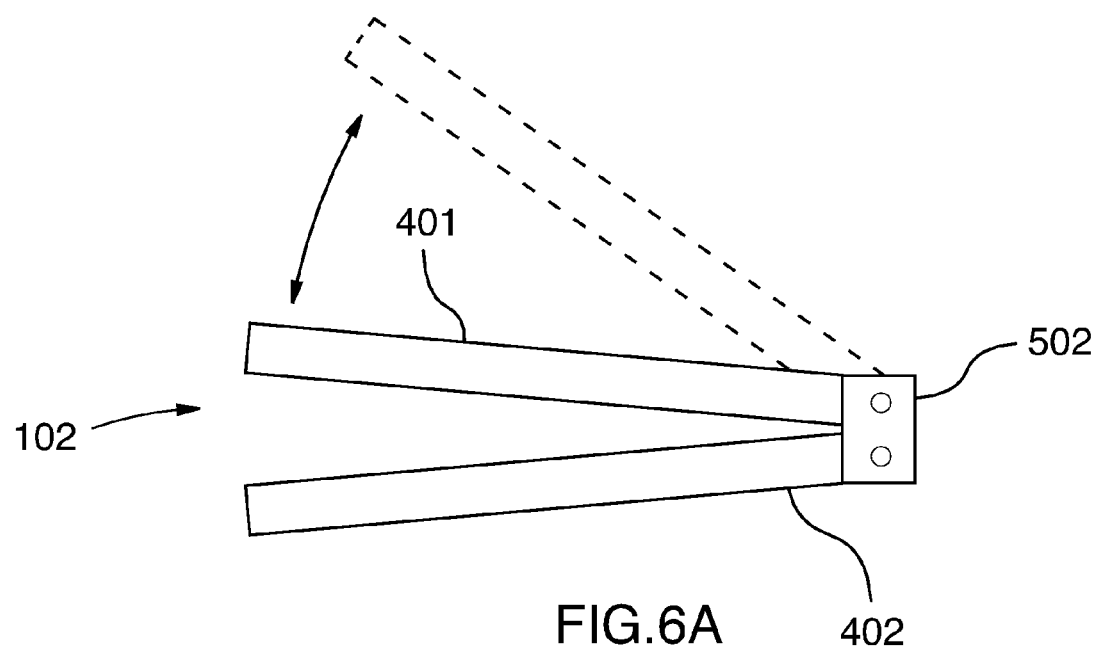
FIGS. 6a and 6b are side views illustrating a clamshell device in accordance with one embodiment.
Figure 6B:
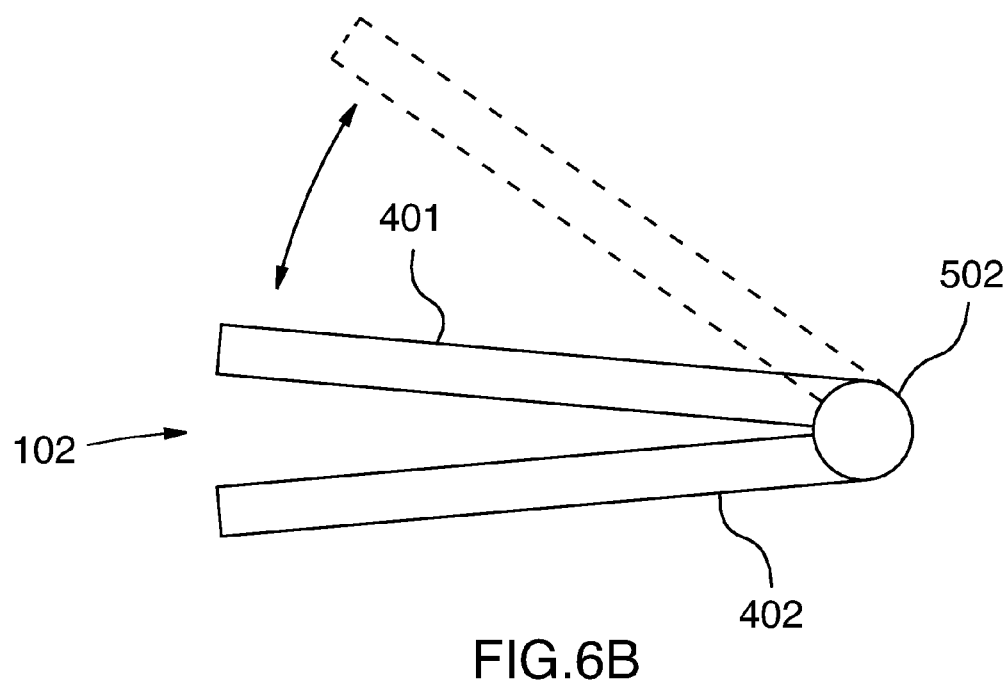

Reference is next made to FIGS. 6a and 6b, which show side views of the clamshell device 102 in accordance in one embodiment. FIG. 6a illustrates the clamshell device 102 having a double hinge or double pins 502. FIG. 6b illustrates the clamshell device 102 having a single hinge or pin 502. FIGS. 6a and 6b also illustrate, using dashed lines, the opening of the lid 401 relative to the lower casing 402.

Figure 7A:
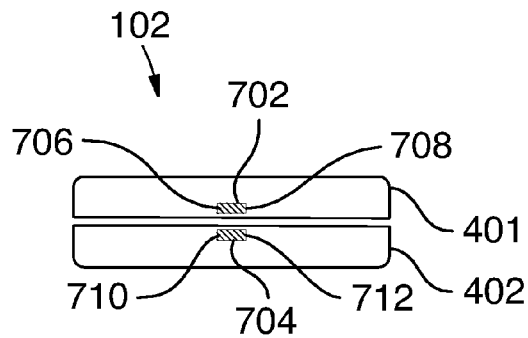
FIGS. 7a and 7b are bottom views illustrating a clamshell device in accordance with one embodiment.
Figure 7B:
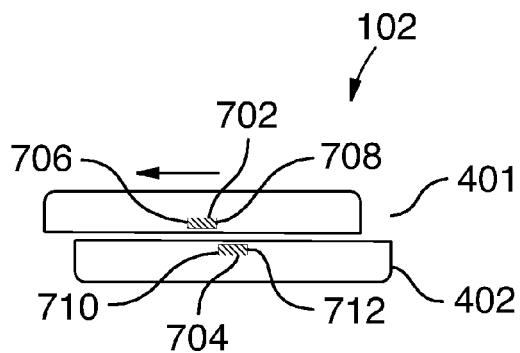

Reference is next made to FIGS. 7a and 7b, collectively referred to as FIG. 7, which show bottom views of the clamshell device 102 in accordance with one embodiment. FIG. 7a shows the clamshell device 102 in its natural closed resting position. FIG. 7b shows the clamshell device 102 while the user is applying a twisting or sliding motion to the device, where the lid 401 is moving laterally with respect to the lower casing 402, as indicated by the arrow. The clamshell device 102 may have additional features, such as mechanical or structural characteristics or magnets, that aid in the opening of the clamshell device 102 when the user applies the twisting motion to the clamshell device 102. In the example shown in FIG. 7, the lid 401 of the clamshell device 102 has a magnet 702 and the lower casing 402 has a magnet 704. Typically these magnets may be embedded in the lid 401 and the lower casing 402 and may not be visible to the user, however the magnets 702 and 704 may also be exposed, depending on the design criteria of a particular application. The magnets 702 and 704 are generally located near the bottom ends of the lid 401 and the lower casing 402, as shown in FIG. 7. The magnets 702 and 704 may be located sufficiently proximate to each other in order to significantly interact with either attraction or repulsion. The magnet 702 has a first pole 706 and a second pole 708 and the magnet 704 has a first pole 710 and a second pole 712. In one example, the pole 706 and the pole 710 are arranged to be opposite poles (e.g., pole 706 may be a north pole and pole 710 may be a south pole) and pole 708 and pole 712 are arranged to be opposite poles (e.g., pole 708 may be a south pole and pole 712 may be a north pole) such that, in the closed resting position shown in FIG. 7a where the magnets 702 and 704 are in alignment, the magnets 702 and 704 are attracting each other and maintain the clamshell device 102 in the closed position. FIG. 7b shows an exemplary situation where the user exerts the twisting or sliding force on the clamshell device 102, as indicated by the arrow, resulting in at least the bottom end of the lid 401 being displaced relative to the bottom end of the lower casing 402. This displacement results in the magnets being moved out of alignment. In the example shown in FIG. 7b, pole 708 now resides approximately above pole 710. Since pole 708 and pole 710 are both south poles, in the present example, the magnets 702 and 704 now repel each other and aid in providing the initial force needed to begin the opening of the clamshell device 102. In another example, magnet repulsion is not material and the simple misalignment of the magnets 702 and 704 removes the closing force allowing the clamshell device 102 to open manually or allowing a hinge spring to provide the opening force and therefore open the device.

Figure 8A:
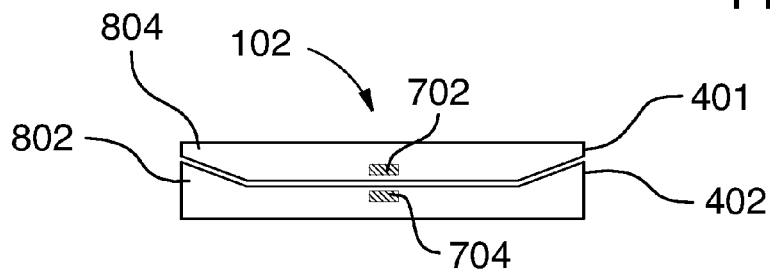
FIGS. 8a and 8b are bottom views illustrating a clamshell device in accordance with one embodiment.
Figure 8B:
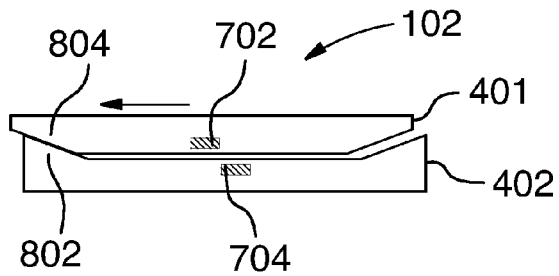

Reference is next made to FIGS. 8a and 8b, which show bottom views of the clamshell device 102 in accordance with one embodiment. FIG. 8a shows the clamshell device 102 in its natural closed resting position. FIG. 8b shows the clamshell device 102 while the user is inducing a twisting or sliding motion in the device, where the bottom end of the lid 401 is moving laterally with respect to the bottom end of the lower casing 402, as indicated by the arrow. The clamshell device 102 shown in FIG. 8 is similar to the clamshell device shown in FIG. 7, with the exception that the lower casing 402 has at least one elevated portion and the lid 401 has at least one complementary recessed portion such that the elevated portion resides within the recessed portion when the clamshell device is in its closed resting position. In the example shown in FIG. 8, the edges of the facing surfaces of the lid 401 and the lower casing 402 are rounded, in a complementary fashion, as shown in FIG. 8a. The lid 401 has recessed portion or rounded edge 804 (also referred to as a beveled edge) and the lower casing has an elevated portion or rounded edge 802 (also referred to as an elevated edge). As shown in FIG. 8b, when the user exerts the twisting or sliding force on the clamshell device 102, as indicated by the arrow, the lid 401 is displaced relative to the lower casing 402 because of the rounded edge 802 of the lower casing 402, which forces the facing surface of the lid 401 upwards and begins the opening of the clamshell device 102. This forcing of the lid 401 upwards which begins the opening of the clamshell device 102 may be due to the rounded edge 802 alone, or may optionally also be due to the magnets 702 and 704, as described in connection with FIG. 7. In one example, the magnets 702 and 704 may be configured and used only to aid in holding the clamshell device 102 in the closed position, or the magnets 702 and 704 may also be configured as described in connection with FIG. 7 to also aid in the opening of the clamshell device 102, through the repulsion of like polarities. In another example, magnet repulsion may not be material and the forcing of the lid 401 upwards which begins the opening of the clamshell device 102 may be due to the rounded edge 802 combined with the dimensional distance between the magnets 702 and 704 overcoming the closing force. Once the magnetic closing force is overcome, the unit may be opened manually or the hinge spring may provide the opening force.

Figure 9A:
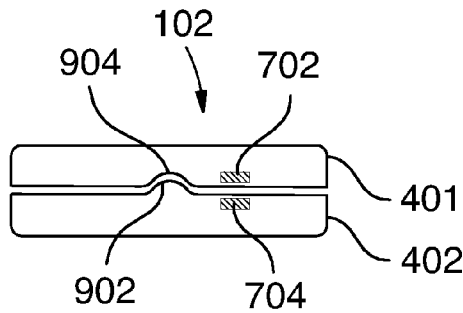
FIGS. 9a and 9b are bottom views illustrating a clamshell device in accordance with one embodiment.
Figure 9B:
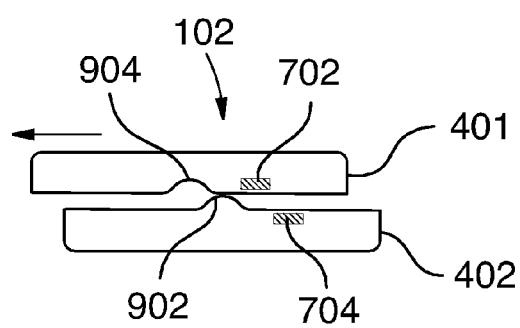

Reference is next made to FIGS. 9a and 9b, collectively referred to as FIG. 9, which show bottom views of the clamshell device 102 in accordance with one embodiment. FIG. 9a shows the clamshell device 102 in its natural closed resting position. FIG. 9b shows the clamshell device 102 while the user is inducing a twisting motion to the device, where at least the bottom end of the lid 401 is moving laterally with respect to the bottom end of the lower casing 402, as indicated by the arrow. The clamshell device 102 shown in FIG. 9 is similar to the clamshell device shown in FIG. 7, with the exception that the facing surfaces of the lid 401 and the lower casing 402 have complimentary structural features. In the example shown in FIG. 9, lid 401 has a recessed portion 904 and lower casing 402 has a complementary elevated portion 902. As shown in FIG. 9b, when the user exerts the twisting or sliding force on the clamshell device 102, as indicated by the arrow, the lid 401 is displaced relative to the lower casing 402 because of the elevation 902 of the lower casing 402, which forces the facing surface of the lid 401 upwards and begins the opening of the clamshell device 102. This forcing of the lid upwards which begins the opening of the clamshell device 102 may be due to the elevation 902 alone, or may optionally also be due to the magnets 702 and 704, as described in connection with FIG. 7. In one example, the magnets 702 and 704 may be configured and used only to aid in holding the clamshell device 102 in the closed position, or the magnets 702 and 704 may also be configured as described in connection with FIG. 7 to also aid in the opening of the clamshell device 102 through the repulsion of like polarities. In another example, the forcing of the lid upwards which begins the opening of the clamshell device 102 uses distance to overcome the closing force (e.g., magnetic attraction) of the magnets 702 and 704 and the magnets 702 and 704 are not configured to repel as the lid lifts upwards. Once the magnetic closing force is overcome, the unit may be opened manually or the hinge spring may provide the opening force.

Figure 10A:
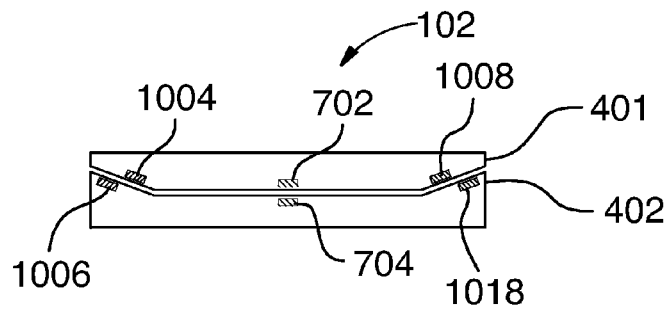
FIGS. 10a and 10b are bottom views illustrating a clamshell device in accordance with one embodiment.
Figure 10B:
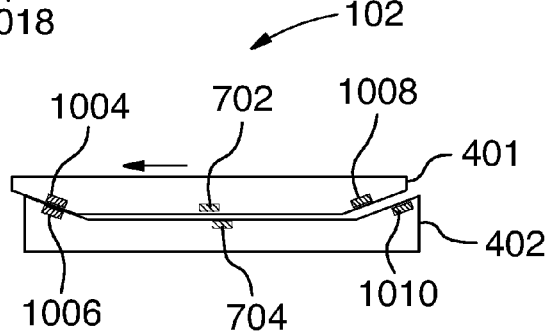

Reference is next made to FIGS. 10a and 10b, collectively referred to as FIG. 10, which show bottom views of the clamshell device 102 in accordance with one embodiment. FIG. 10a shows the clamshell device 102 in its natural closed resting position. FIG. 10b shows the clamshell device 102 while the user is applying a twisting or sliding force to the device, where at least the bottom end of the lid 401 is moving laterally with respect to the bottom end of the lower casing 402, as indicated by the arrow. The clamshell device 102 shown in FIG. 10 is similar to the clamshell device shown in FIG. 8, with the exception that additional magnets 1004 and 1008 have been added to lid 401 and additional magnets 1006 and 1010 have been added to lower casing 402. As shown in FIG. 10a, when the clamshell device 102 is in the closed resting position, magnet 1004 of lid 401 and magnet 1006 of lower casing 402 are generally not aligned, magnet 1008 of lid 401 and magnet 1010 of lower casing 402 are generally not aligned, and magnets 702 and 704 are generally aligned and are configured to be in an attracting, opposite pole configuration in order to aid in retaining the clamshell device 102 in the closed position.

As shown in FIG. 10b, when the user exerts the twisting or sliding force on the clamshell device 102, as indicated by the arrow, the lid 401 is further displaced relative to the lower casing 402 because of the rounded or sloped edge of the lower casing 402, which forces the lid 401 upwards and begins the opening of the clamshell device 102. In the example shown in FIG. 10, this forcing of the lid upwards which begins the opening of the clamshell device 102 may be due to the rounded or sloped edges in conjunction with the attracting magnets 702 and 704 being forced out of alignment and magnets 1004 and 1006 being forced into alignment, which may be configured in a like-pole, repelling configuration, therefore aiding in the opening of the clamshell device 102. As shown in the example of FIG. 10, if the user chooses to twist or slide the clamshell device in the opposite direction of the arrow, this would then force attracting magnets 702 and 704 out of alignment and magnets 1008 and 1010 into alignment, which may be configured in a like-pole, repelling configuration, therefore aiding in the opening of the clamshell device 102. In one example, the magnets 702 and 704 may be used as shown in FIG. 8 only to aid in holding the clamshell device 102 in the closed position, or the magnets 702 and 704 may be configured as described in connection with FIG. 7 to also aid in the opening of the clamshell device 102, through the repulsion of like polarities.

While magnets and curved and/or sloped surfaces have been described in connection with FIGS. 7-10, it is also contemplated that other complementary mechanical structures may be used on the lid 401 and the lower casing 402 in order to create a situation where the clamshell device is maintained in a locked and closed position when the clamshell device 102 is in its closed and resting position and where the clamshell device is able to be opened when the sliding or twisting force is exerted by the user on the clamshell device 102. One such structure that may be used is a key and latch configuration, where a tab in one section (e.g., either the lid 401 or the lower casing 402) interfaces with a keyhole in the other section. This configuration is described below, in connection with FIGS. 13a-c.

Figure 11:
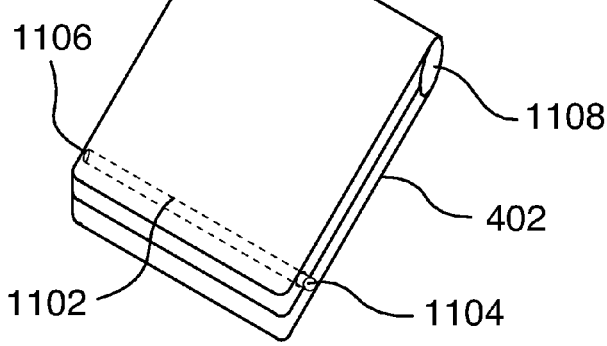
FIG. 11 is a perspective view illustrating a clamshell device in accordance with one embodiment.

Referring now to FIG. 11, a perspective view of a clamshell device 102 in accordance with an embodiment of the present disclosure is shown. The clamshell device 102 shown in FIG. 11 has an internal sliding component 1102. The internal sliding component 1102 is shown to be internal to the lid 401, however in another example the internal sliding component 1102 may instead be implemented in the lower casing 402. The internal sliding component 1102 may be a slide mechanism that protrudes from the lid 401 at the sides of the lid 401 where the protrusions are formed as contact points 1104 and 1106 for a user to contact with his fingers (e.g., buttons). The internal sliding component 1102 provides an alternative to the configuration shown in FIG. 5 where the lid 401 slides or twists relative to the lower casing 402. Where the internal sliding component 1102 is implemented, the sliding component 1102 may be responsible for moving magnets or a mechanical lock and the hinge 502 that provides for twisting or sliding of the lid 401 relative to the lower casing 402 is not be needed. In this regard, the clamshell device 102 shown in FIG. 11 has a conventional, non-sliding hinge 1108. Once the magnetic lock is sufficiently misaligned, the clamshell device 102 may be opened manually or by the force of a spring loaded hinge.

Figures 12A, 12B:
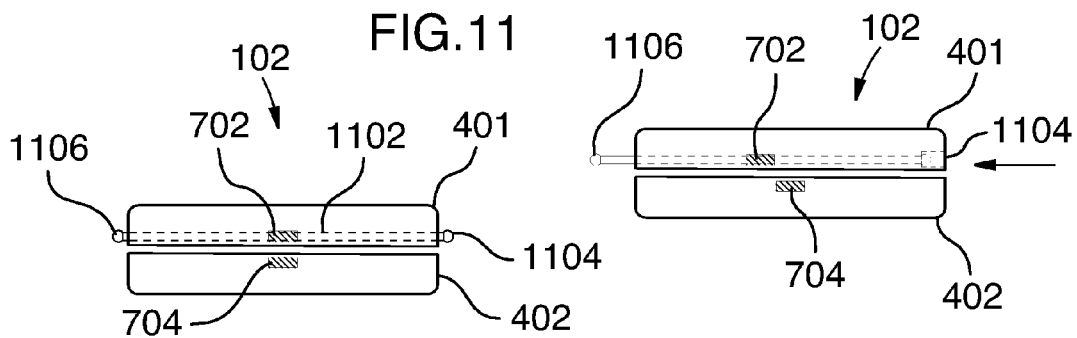
FIGS. 12a and 12b are bottom views illustrating a clamshell device in accordance with one embodiment.

Reference is next made to FIGS. 12a and 12b, collectively referred to as FIG. 12, which show bottom views of the clamshell device 102 in accordance with one embodiment. FIG. 12a shows the clamshell device 102 in its natural closed resting position. FIG. 12b shows the clamshell device 102 while the user is applying a sliding force to the internal slide 1102 (e.g., using the button 1104) to move the slide 1102 laterally with respect to the lid 401, as indicated by the arrow. In the example shown in FIG. 12, the lid 401 of the clamshell device 102 has a the magnet 702 coupled to the internal slide 1102 and the lower casing 402 has the magnet 704. Typically these magnets may be embedded in the lid 401 and the lower casing 402 and would not be visible to the user, however the magnets 702 and 704 may also be exposed, depending on the design criteria of a particular application. The magnets 702 and 704 may have the same pole configuration described in connection with FIG. 7. FIG. 12b shows an exemplary situation where the user induces the sliding motion on the internal slide 1102, as indicated by the arrow, resulting in the slide 1102 being displaced relative to the lid 401, which results in the magnet 702 being displaced out of alignment relative to the magnet 704. In the present example of FIG. 12b, the magnets 702 and 704 now repel each other and aid in providing the initial force needed to begin the opening of the clamshell device 102.

While magnets have been described in connection with FIG. 12, it is also contemplated that other complementary mechanical structures may be used on the slide 1102 of the lid 401 in order to create a situation where the clamshell device is maintained in a locked and closed position when the clamshell device 102 is in its closed and resting position and where the clamshell device is able to be opened when the sliding force is exerted by the user on the internal slide 1102. One such structure that may be used is a key and latch configuration, where a tab in one section (e.g., either the lid 401 or the lower casing 402) interfaces with a keyhole in the other section. In the example with the internal slide 1102, the slide 1102 may have a tooth on it that interfaces with a keyhole or latch of the lower cover 402.

Figure 13A:
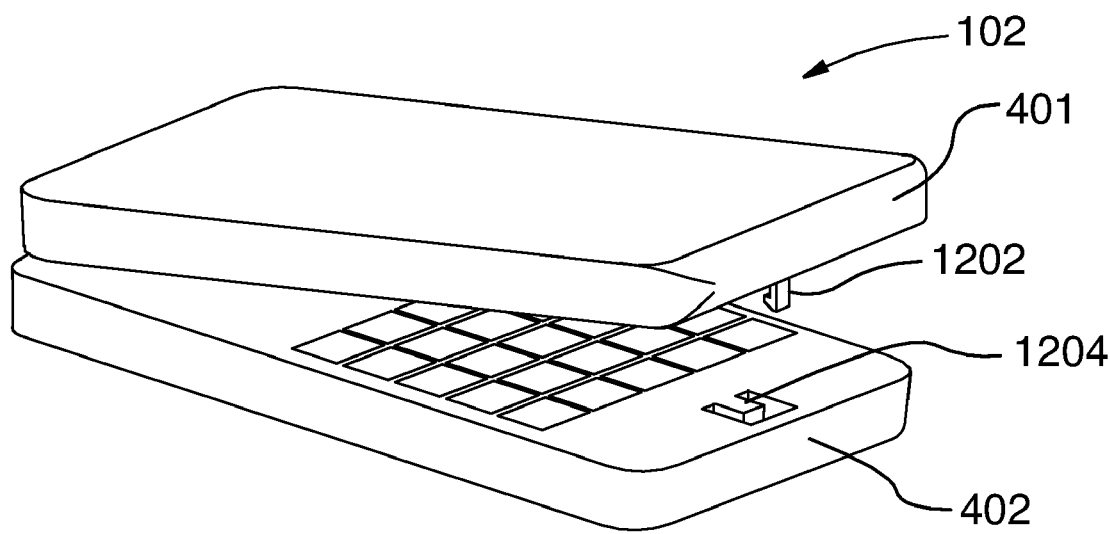
FIG. 13a is a perspective view illustrating the clamshell device in accordance with one embodiment.
Figure 13B:
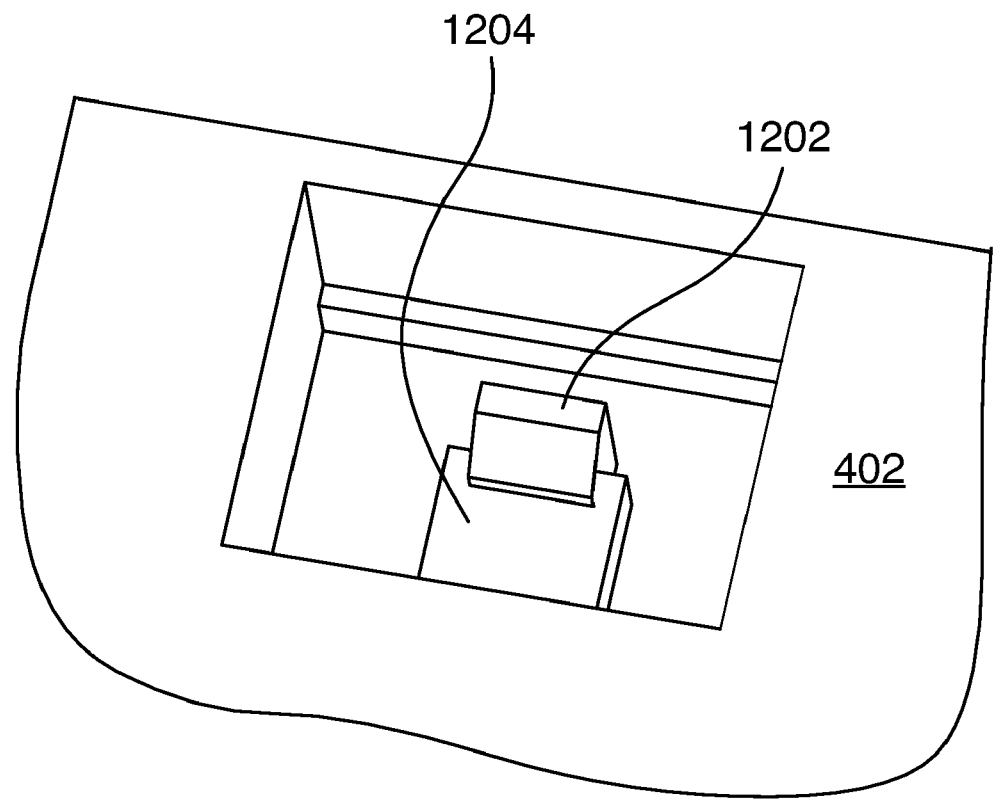
FIG. 13b is a backside view of the clamshell device of FIG. 13a in accordance with one embodiment.
Figure 13C:
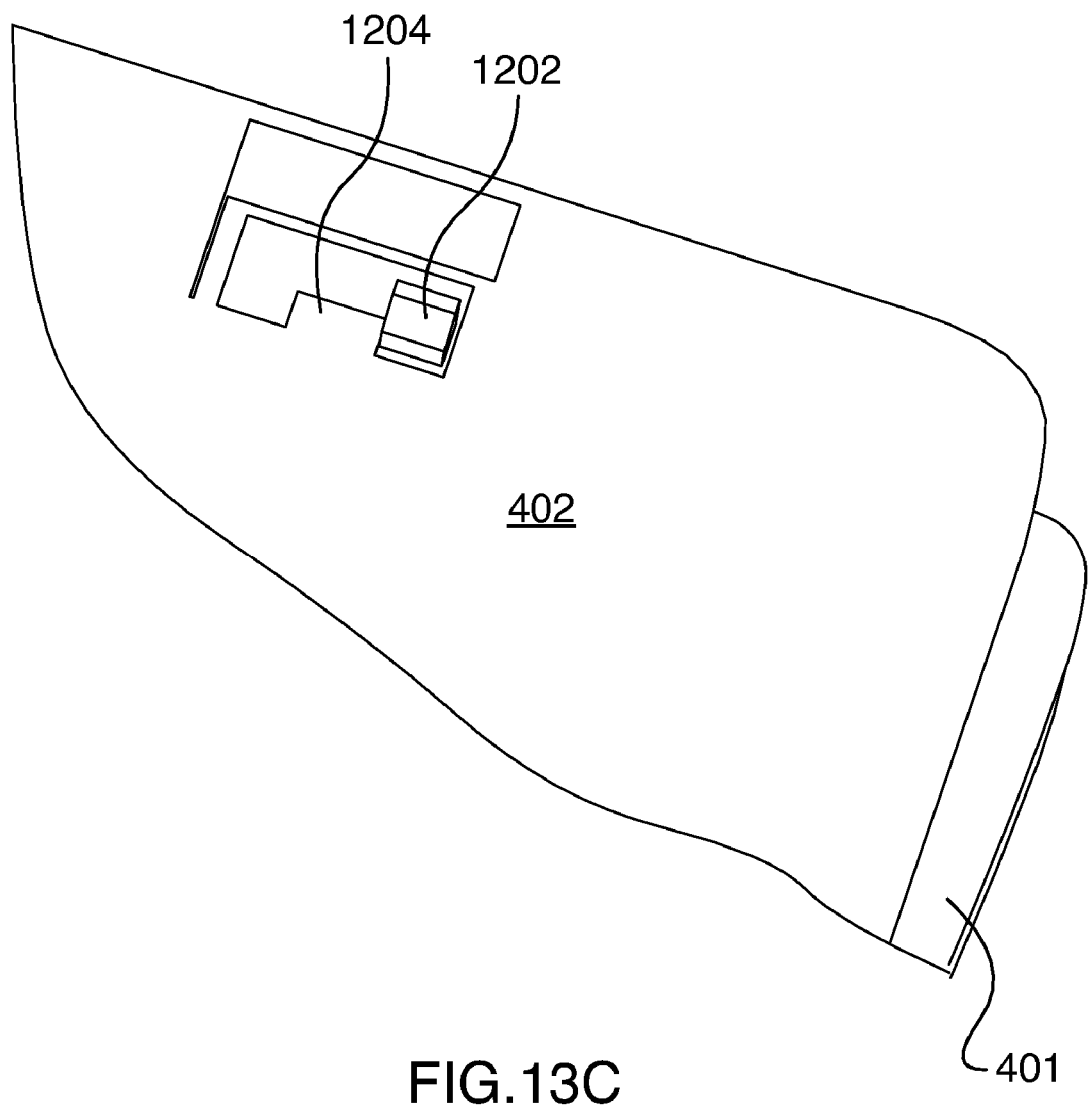
FIG. 13c is a backside view of the clamshell device of FIG. 13a in accordance with one embodiment.

Reference is next made to FIGS. 13a-c, collectively referred to as FIG. 13. FIG. 13a shows a perspective view of the clamshell device 102 having a mechanical lock or mechanical snap configuration in accordance with one embodiment. FIG. 13b shows a backside view of the clamshell device 102 with a portion of the lower casing 402 cut away in order to illustrate the mechanical snap while the clamshell device is in it closed, resting position. FIG. 13c shows a backside view of the clamshell device 102 with a portion of the lower casing 402 cut away in order to illustrate the mechanical snap while the lid 401 is displaced relative to the lower casing 402.

Referring to FIG. 13a, the clamshell device 102 is shown having the lower casing 402 and the lid 401. The lid 401 has a snap 1202 and the facing surface of the lower casing 402 has a complementary cutout and tab 1204. Referring now to FIG. 13b, an imaginary cutout is shown in the backside of the lower casing 402 for the purpose of illustrating the interface of the snap 1202 and the tab 1204 while the clamshell device 102 is in a closed, resting position. As shown in FIG. 13b, the snap 1202 engages behind the tab 1204 when the clamshell device 102 is closed. As indicated by the arrows, the lower casing 402 may be twisted relative to the lid 401.

Referring to FIG. 13c, the clamshell device is shown when the lower casing 402 is twisted relative to the lid 401. This displaces the lower casing 402 relative to the lid 401, meaning that the snap 1202 no longer rests behind the tab 1204, and the snap 1202 is no longer mechanically restraining the clamshell device 102 to remain in the closed position.

As shown in FIGS. 13a-c, the lid 401 has the snap 1202 located near the bottom end of the lid and the lower casing 402 has the complementary tab and cutout 1204 located near the bottom end of the lower casing 402. The snap 1202 and tab and cutout 1204 face each other on the adjacent facing surfaces and are configured such that the snap 1202 protrudes into the cutout and engages behind the tab 1204 when the wireless handheld device 102 is in the closed resting position. The tab 1204 and snap 1202 lock the wireless handheld device 102 in the closed position. When the bottom end of the lid 401 is laterally displaced relative to the bottom end of the lower casing 402 generally in an axial direction of the hinge 1108, the snap 1202 becomes misaligned with the tab 1204 and unlocks the wireless handheld device 102 for opening.

While the present disclosure describes a number of features individually or in combination for either retaining the clamshell device 102 in a closed position or aiding in the opening of the clamshell device 102, it is intended that any of these features may be used in isolation on a clamshell device or together in any combination on a clamshell device.

While the present disclosure is primarily described as a system, a person of ordinary skill in the art will understand that the present disclosure is also directed to a method for carrying out the disclosed system and including method steps for performing each described aspect of the interaction of the apparatus parts.

The above illustrations use an exemplary clam-shell flip phone device, but the concepts can be expanded to a slideable mobile device, a twist mobile device or any mobile device with two distinct housings that is capable of being opened and closed.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A wireless handheld device comprising:
a lower casing having a bottom end and a top end;
a lid having a bottom end and a top end, the top end of the lid being rotatably coupled to the top end of the lower casing with at least one hinge component such that the handheld device is rotatable from a closed position to an open position and from an open position to a closed position, the lid and the lower casing having adjacent facing surfaces when in the closed position;
wherein, when the wireless handheld device is in the closed position, at least the bottom end of the lid is displaceable relative to the lower casing generally in an axial direction of the hinge component such that the facing surfaces become misaligned for easy grasping of the lower casing and the lid;
the lid further having a snap located near the bottom end of the lid and the lower casing further having a complementary tab and cutout located near the bottom end of the lower casing, the snap and tab and cutout facing each other on the adjacent facing surfaces and being configured such that the snap protrudes into the cutout and engages behind the tab when the wireless handheld device is in the closed resting position, the tab and snap locking the wireless handheld device in the closed position, and when at least the bottom end of the lid is displaced relative to the lower casing generally in an axial direction of the hinge component the snap becomes misaligned with the tab and unlocks the wireless handheld device for opening.

2. A wireless handheld device comprising: a lower casing having a bottom end and a top end; a lid having a bottom end and a top end and two side edges extending between the top end and the bottom end, the top end of the lid being rotatably coupled to the top end of the lower casing with at least one hinge component such that the wireless handheld device is rotatable from a closed position to an open position and from an open position to a closed position, the lid and the lower casing having adjacent facing surfaces when in the closed position; the lid further having a slideable component contained near the bottom end of the lid, the slideable component being contained within the lid and protruding from at least one of the side edges of the lid and being slideable generally in an axial direction of the hinge component, the slideable component effecting a physical movement to begin an opening of the wireless handheld device.

3. The wireless handheld device according to claim 2, wherein the lid further has at least one elevated portion coupled to the slideable component and the lower casing further has at least one complementary recessed portion such that the elevated portion resides within the recessed portion when the wireless handheld device is in the closed position and the elevated portion forces the facing surface of the lower casing away from the lid when the slideable component is slid in the axial direction, therefore moving the elevated portion in the axial direction.

4. The wireless handheld device according to claim 2, wherein the lid has at least one magnet coupled to the slideable component near the bottom end of the lid and the lower casing has at least one corresponding magnet near the bottom end of the lower casing, the corresponding magnets being sufficiently proximate to each other to interact with either attraction or repulsion.

5. The wireless handheld device according to claim 4, wherein the interaction of the corresponding magnets includes one or more of: attraction when the wireless handheld device and the slideable component are in the closed resting position and repulsion when the slideable component is slid in the axial direction, thus changing the alignment of the corresponding magnets.

6. The wireless handheld device according to claim 4, wherein the hinge component includes a spring loaded hinge joint and wherein an attractive force between the corresponding magnets is greater than an opening force of the spring loaded hinge joint in the closed position.

7. The wireless handheld device according to claim 2, the lid further having a snap located near the bottom end of the lid coupled to the slideable component and the lower casing further having a complementary tab and cutout located near the bottom end of the lower casing, the snap and tab and cutout facing each other on the adjacent facing surfaces and being configured such that the snap protrudes into the cutout and engages behind the tab when the wireless handheld device is in the closed resting position, the tab and snap locking the wireless handheld device in the closed position, and when the slideable component is slid in the axial direction the snap becomes misaligned with the tab and unlocks the wireless handheld device for opening.

8. A wireless handheld device comprising:
a lower casing having a bottom end and a top end; and
a lid having a bottom end and a top end and two side edges extending between the top end and the bottom end, the top end of the lid being rotatably coupled to the top end of the lower casing with at least one hinge component, the lid and the lower casing having adjacent facing surfaces when in a closed position, the arrangement being such that the lid is rotatable about the at least one hinge component relative to the lower casing from the closed position to an open position and from the open position to the closed position;
wherein the lid further has a slideable component contained near the bottom end of the lid, the slideable component being contained within the lid and protruding from at least one of the side edges of the lid and being slideable generally in an axial direction of the at least one hinge component;
wherein the lid has at least one magnet coupled to the slideable component near the bottom end of the lid and the lower casing has at least one corresponding magnet near the bottom end of the lower casing, wherein the slideable component moves the magnet in the lid relative to the magnet in the lower casing such that the magnets interact with either attraction or repulsion depending on whether the magnets are aligned or misaligned.

9. The wireless handheld device according to claim 8, wherein the magnets are aligned and interact with attraction when the wireless handheld device is in the closed position.

10. The wireless handheld device according to claim 8, wherein the magnets are misaligned and interact with repulsion when the slideable component is slid in the axial direction.

11. The wireless handheld device according to claim 8, wherein the slideable component moves the magnet in the lid between alignment and misalignment with the magnet in the lower casing.

12. The wireless handheld device according to claim 8, wherein the hinge component includes a spring loaded hinge joint and wherein an attractive force between the corresponding magnets is greater than an opening force of the spring loaded hinge joint in the closed position.

13. The wireless handheld device according to claim 8, wherein the lid further has at least one elevated portion coupled to the slideable component and the lower casing further has at least one complementary recessed portion such that the elevated portion resides within the recessed portion when the wireless handheld device is in the closed position and the elevated portion forces the facing surface of the lower casing away from the lid when the slideable component is slid in the axial direction, therefore moving the elevated portion in the axial direction.

14. The wireless handheld device according to claim 8, the lid further having a snap located near the bottom end of the lid coupled to the slideable component and the lower casing further having a complementary cutout and tab located near the bottom end of the lower casing, the snap and tab and cutout facing each other on the adjacent facing surfaces and being configured such that the snap protrudes into the cutout and engages behind the tab when the wireless handheld device is in the closed resting position, the tab and snap locking the wireless handheld device in the closed position, and when the slideable component is slid in the axial direction the snap becomes misaligned with the tab and unlocks the wireless handheld device for opening.

* * * * *